United States Patent
Martinez (10) Patent No.: US 7,027,620 B2
(45) Date of Patent: Apr. 11, 2006

(54) METHOD OF RECOGNIZING PARTIALLY OCCLUDED AND/OR IMPRECISELY LOCALIZED FACES

(75) Inventor: Aleix M. Martinez, Lafayette, IN (US)

(73) Assignees: Sony Corporation, Tokyo (JP); Purdue Research Foundation, West Lafayette, IN (US)

( * ) Notice: Subject to any disclaimer, the term of this patent is extended or adjusted under 35 U.S.C. 154(b) by 563 days.

(21) Appl. No.: 09/876,395

(22) Filed: Jun. 7, 2001

(65) Prior Publication Data

US 2003/0007669 A1    Jan. 9, 2003

(51) Int. Cl.
   *G06K 9/00*   (2006.01)

(52) U.S. Cl. .................. 382/118; 382/115; 382/181

(58) Field of Classification Search ............... 382/115, 382/116, 117, 118, 154, 181, 296, 308; 340/5.1, 340/5.2, 5.8, 5.81, 5.82, 5.83; 348/77, 78
See application file for complete search history.

(56) References Cited

U.S. PATENT DOCUMENTS

| | | | | |
|---|---|---|---|---|
| 5,710,833 A | * | 1/1998 | Moghaddam et al. | 382/228 |
| 5,719,951 A | * | 2/1998 | Shackleton et al. | 382/118 |
| 6,292,575 B1 | * | 9/2001 | Bortolussi et al. | 382/118 |

OTHER PUBLICATIONS

Martinez, A.; Face image retrieval using HMM's; Jun. 22,1999; IEEE Workshop on Content-Based Access of Imag and Video Libraries; pp. 35-39.*
Turk et al., "Face Recognition Using Eigenfaces," *IEEE Computer Vision and Pattern Recognition*, 1991, pp. 586-591.
Turk et al., "Eigenfaces for Recognition," *Journal of Cognitive Neuroscience*, vol. 3, No. 1, 1991, pp. 71-86.

* cited by examiner

*Primary Examiner*—Kanjibhai Patel
*Assistant Examiner*—John Strege
(74) *Attorney, Agent, or Firm*—Sonnenschein, Nath & Rosenthal LLP; Bahret & Associates (57) ABSTRACT

A method of recognizing a test face given an imprecise localization and/or a partially occluded face. Using an eigenspace representation of the learning image, a subspace is computed that represents localization errors within the eigenspace. This is computed by calculating an actual localization error of the localization of the learning image. Accounting for the calculated actual localization error, all possible morphed faces are projected onto the eigenspace. For all possible faces, the subspace is modeled where all of the possible localizations of the possible faces lie using a Gaussian distribution. To accommodate for possible partial occlusions, for all possible faces, the possible faces are divided into n different local parts. Each of the n local parts are modeled using a Gaussian distribution. A global probability of the test face is computed by adding all local probabilities defined by the Gaussian distribution. The test face is recognized based on the computed subspace and/or the accounted for possible partial occlusions.

7 Claims, 5 Drawing Sheets

METHOD OF RECOGNIZING PARTIALLY OCCLUDED AND/OR IMPRECISELY LOCALIZED FACES

BACKGROUND OF THE INVENTION

The present invention generally relates to computer vision. The present invention has specific application for face recognition.

The increasing interest in the face recognition field is fueled by its many potential applications as well as for its scientific interest. Recent work on subspace analysis techniques for face recognition has proven to be very useful under certain "constrained" circumstances (e.g. where the illumination conditions remain closely the same for learning and testing shots, where facial expressions between learning and testing do not differ much, etc.). Among them, it is worthwhile to emphasize the Principal Component Analysis (PCA) approach.

Unfortunately, many problems remain to be solved before the PCA approach can be applied to "unconstrained" domains. Two of these problems are: (i) the imprecise localization of faces and (ii) occlusions. Each of these problems implies a failure of identification in known face recognition approaches. Almost nothing has been proposed to overcome the first problem and little has been done to overcome the second problem.

Accordingly, new face recognition approaches are needed. There is a need to provide a face recognition approach that recognizes a face where the localization step does not guarantee a precise localization and/or where parts of the face appear occluded by, for example, glasses or clothing.

SUMMARY OF THE INVENTION

The present disclosure provides one or more inventions directed to improvements in face recognition. These inventions may be provided in a single all-encompassing embodiment or practiced separately.

To this end, in an embodiment, there is provided a method of recognizing a test face, wherein a localization of the test face may be imprecise. In the context of this disclosure, unless otherwise qualified, the phrase "test face" means an image or face that is to be recognized. During a learning stage, using a feature space representation of a learning image for each of a plurality of subjects, a subspace is computed that represents localization errors within the feature space. The subspace is computed by calculating an actual localization error of the localization of the learning image. Accounting for the calculated actual localization error, all possible morphed faces are projected onto the feature space. For all possible faces, the subspace is modeled where all of the possible localizations of the possible faces lie using of a Gaussian distribution. Then, during an identification stage, the test face is recognized based on the computed subspace from the learning stage.

In an embodiment, prior to computing the subspace, the localization of the learning image can be computed. The learning image is pre-localized. Unwanted segments are omitted. Both eyes and the mouth of the learning image are localized. The face is rotated until the learning image is frontal. Boundaries of the learning image are identified. Then, the learning image is morphed to a standard face.

In an embodiment, The step of calculating the actual localization error comprises manually localizing a number pertinent features of all possible faces; and computing the actual localization error as a difference between the localization of the learning image and the manually localized features.

In an embodiment, there is provided a method of recognizing a test face, wherein the test face may be partially occluded. For all possible faces, the possible faces are divided into n different local parts. Each of the n local parts are modeled using a Gaussian distribution corresponding to a predetermined subset that represents localization error. A global probability of the test face is computed by adding all local probabilities defined by the Gaussian distribution. The test face is then recognized based on the computed global probability.

In an embodiment, the modeling step further comprises the steps of generating a local eigenspace representation and generating a Gaussian model. The local eigenspace representation is generated by applying a localization stage to each of the possible faces; generating a leaning set; finding a mean vector of each element of the learning set; computing covariance matrices for each element of the learning set; and obtaining the local eigenspaces by taking the eigenvectors associated with the largest eigenvalues of the covariance matrices. The Gaussian model is generated by constructing all eigenspaces by finding eigenvectors associated to the highest eigenvalues of each covariance matrix; and searching for subspaces that account for the localization error by projecting all learning instances onto the constructed eigenspaces.

In an embodiment, the step of computing the global probabiliity of the test face further comprises the steps of: localizing the test face; morphing the test face to a final standard face; project each of the n local parts onto computed eigenspaces, wherein a probability of a given match is directly associated to a Mahalanobis distance ; adding all local Mahalanobis distances; and searching for minima from the added distances.

In an embodiment, there is provided a method of recognizing a test face, the method comprising a) using a feature space representation of a learning image for each of a plurality of subjects, computing a subspace that represents localization errors within feature space by calculating an actual localization error of the localization of the learning image; accounting for the calculated actual localization error, projecting all possible morphed faces onto the feature space; and for all possible faces, modeling the subspace where all of the possible localizations of the possible faces lie using of a Gaussian distribution; and b) accounting for possible partial occlusions of the test face by: for all possible faces, dividing the possible face into n different local parts; modeling each of the n local parts using a Gaussian distribution corresponding to a predetermined subset that represents localization error; and computing a global probability of the test face by adding all local probabilities defined by the Gaussian distribution. The test face is recognized face based on the computed subspace and/or the accounted for possible partial occlusions.

Thus, the present invention provides a probabilistic approach that solves both the localization problem and the occlusion problem while using an eigenspace representation. In contrast to other approaches that have been defined to solve the occlusion problem, where a simple voting space is used, the present invention uses a probabilistic method that analyses how "good" a local match is.

These and other features of the present invention will become clearer with reference to the following detailed description and the presently preferred embodiments and accompanying drawings.

DETAILED DESCRIPTION OF THE PRESENTLY PREFERRED EMBODIMENTS

As discussed above, there is provided a method and device for recognition of imprecisely localized and/or partially occluded faces.

Figure 1A:
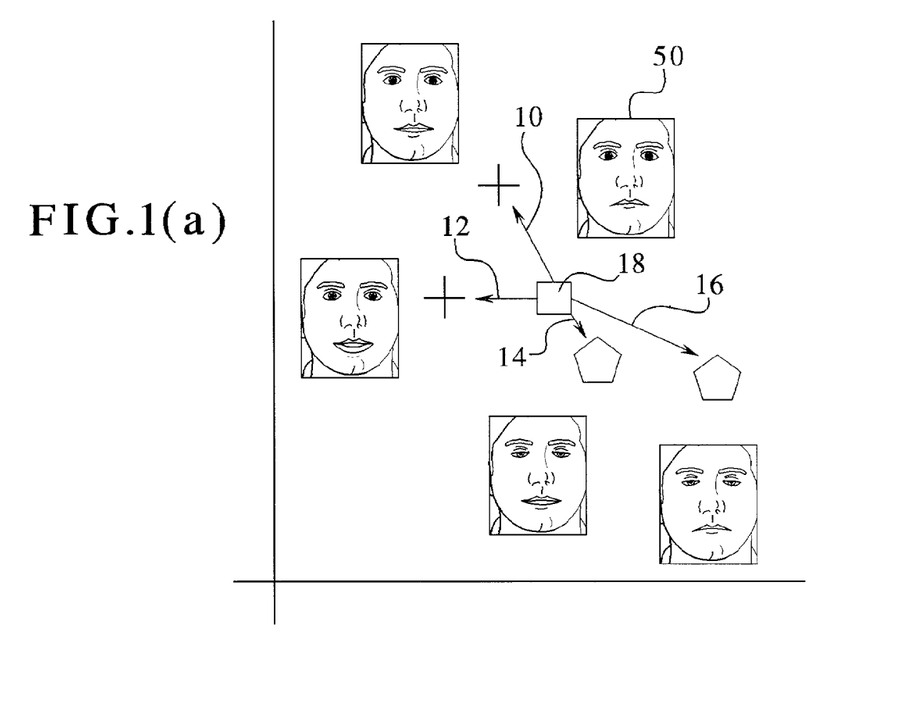
FIG. 1(a) illustrates how a small localization error can result in an eigenspace representation of a test face that is close to an incorrect class.

The localization error problem is encountered when a small localization error makes the eigenspace representation of a test image close to an incorrect class. This is depicted in FIG. 1(a). FIG. 1(a) illustrates two classes, one drawn using crosses and another using pentagons. For each class, there are two learned feature vectors 10, 12, 14, 16, each corresponding to the same image but accounting for different localization errors. The test image 18 (which belongs to the "cross" class) is shown as a square. Note that while one of the "pentagon" samples 16 is far from the test feature vector, i.e. the square, the other 14 corresponds to the closest sample, i.e. while there is a localization that leads one to a correct classification, the other does not. This point becomes critical when the learning and testing images differ on facial expression, illumination conditions, etc., as well as for duplicates. A "duplicate" is an image of a face that is taken at a different time, for example, weeks, months or even years later. Note that the localization problem does not mean a failure in localizing faces: it is assumed that the face localization step is successful, however small errors of precision can make the face identification process fail.

Figure 1B:
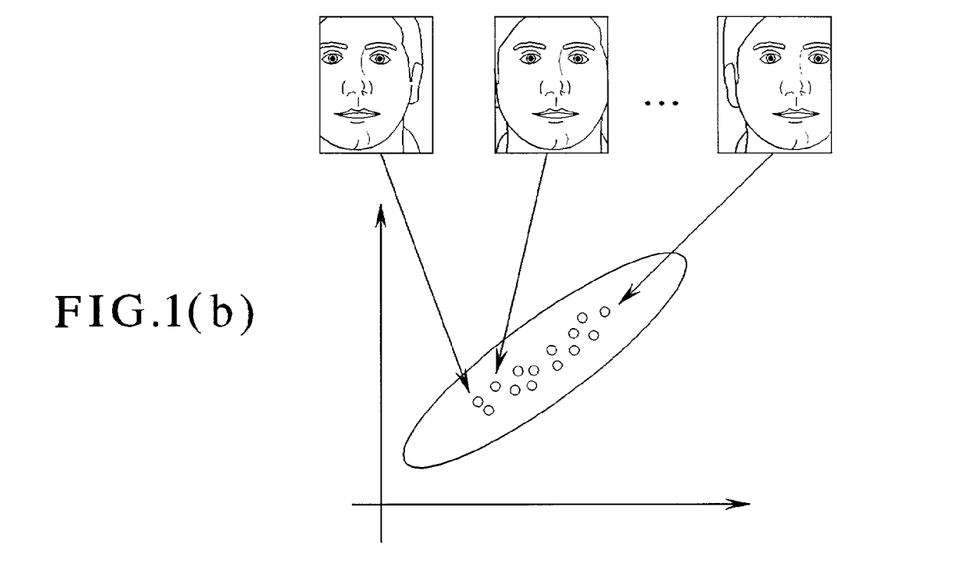
FIG. 1(b) illustrates computing a subspace that represents localization errors with the eigenspace representation of the test face in accordance with the present invention.

The present invention inventively overcomes this known disadvantage by providing for learning the subspace that represents small localization errors within the eigenspace. To do that, first the actual error (the physics to be modeled) of the localization system (about the x and y image axes) is calculated. Second, accounting for this localization error, all possible morphed faces are projected onto the eigenspace. And third, for each person, the subspace where all his/her possible localizations lie are modeled by means of a Gaussian distribution. This process is displayed in FIG. 1(b).

Figure 2A:
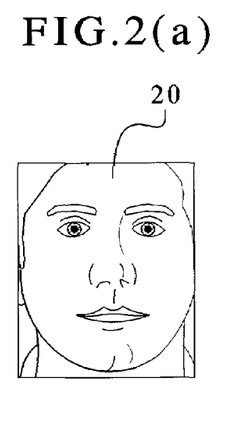
FIG. 2(a) illustrates a possible learning face.
Figure 2B:
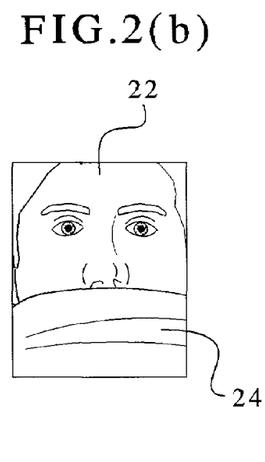
FIG. 2(b) illustrates a test face which is partially occluded.

The occlusion problem is visually depicted in FIGS. 2(a) and 2(b). Assume that the image 20 of FIG. 2(a) is used for learning and that the image 22 of FIG. 2(b) is used for testing. A global PCA approach will, in general, be unable to correctly identify the test image 22 because a large part of the test image 22 is occluded by a scarf 24.

Figure 2C:
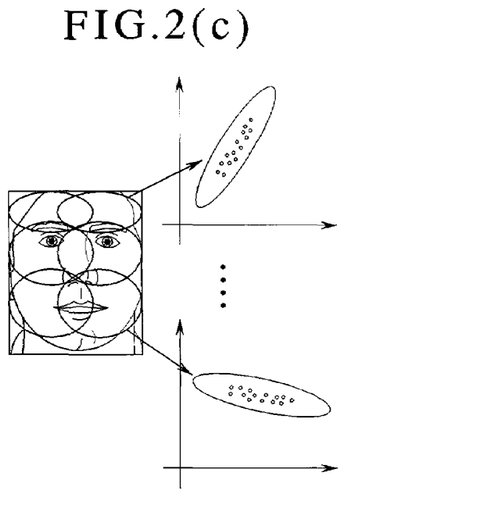
FIG. 2(c) illustrates dividing the possible learning face into different local parts and computing a global identity of the test face in accordance with the present invention.

The present invention inventively overcomes this known disadvantage by dividing each face into n different local parts (as shown in FIG. 2(c)). Each of these n local parts is modeled by using the above-mentioned Gaussian distribution. The global identity of any given test image 22 can then be easily computed by simply adding all local probabilities (defined by the Gaussian distributions). To compute the local probabilities, the Mahalanobis distance is used. Applicant's present method differs from previous local PCA approaches in that Applicant's method uses a probabilistic approach rather than a voting space. The advantage of Applicant's present method is that, although a local area of the face might have been not classified as the first (best) option, generally either the incorrect first (best) choice has a very small probability, or the correct class is within the most probable choices.

Figure 3:
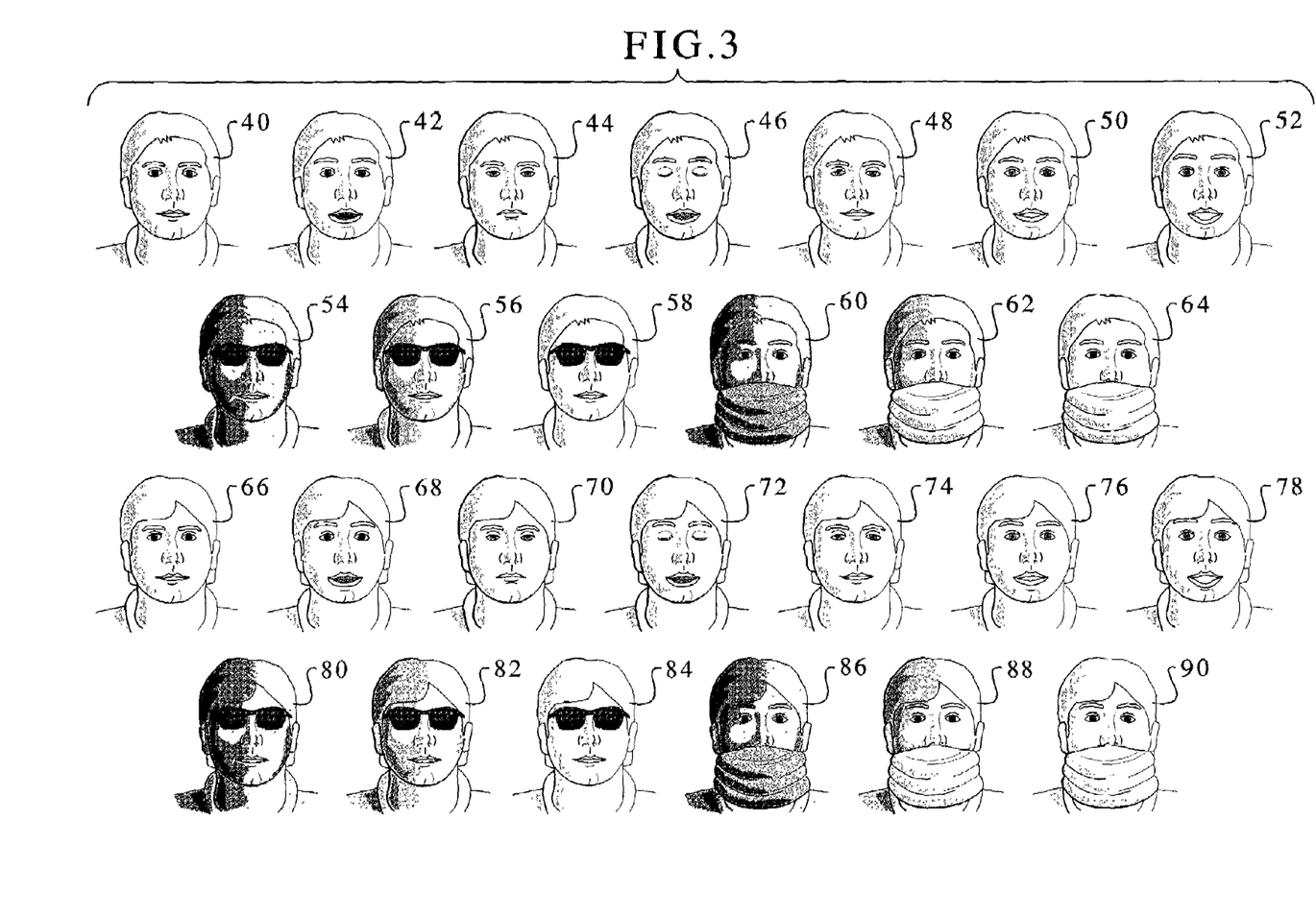
FIG. 3 displays a database of possible faces for a test face.

The method of the present invention has been tested using 2600 images of the AR-face database. Note that while other face databases, such as the FERET, deal with a very large number of people, the AR-face database contains a larger number of images per individual, e.g. under different. Face images of the AR-face database appear at different illumination conditions, with different facial expressions, and under different occlusions (wearing sunglasses or a scarf). For illustration, these images for one subject are shown in FIG. 3. The various images displayed in FIG. 3 are described below in this disclosure.

1.0 The Localization Problem

The below-described localization method allows replication and assists in describing both the localization error problem and the physics behind the present invention. The present invention is not limited to the below-described localization method, and any alternative localization algorithm can be used.

1.1 Face Localization

Figure 4A:
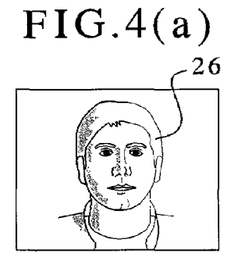
FIG. 4(a) illustrates a test face.
Figure 4B:
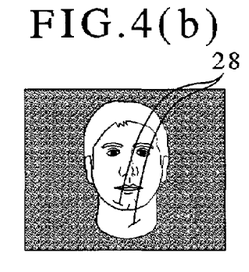
FIG. 4(b) illustrates the test face pre-localized.
Figure 4C:
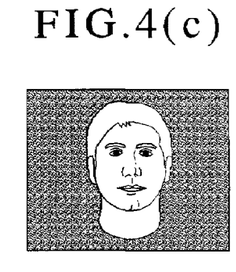
FIG. 4(c) illustrates the pre-localized test face with small isolated segments removed.
Figure 4D:
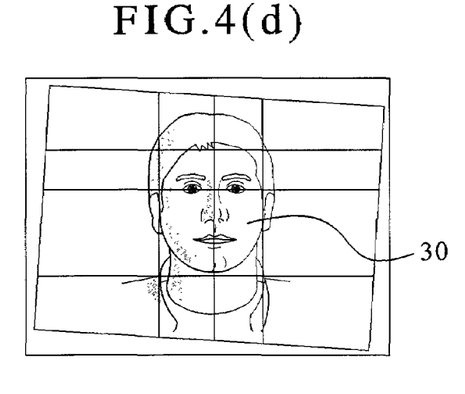
FIG. 4(d) illustrates a face localization result.

In known localization methods, color has been largely used to localize faces in an image. Human skin color forms a dense manifold in color space which makes it an easy feature to detect in images. The three dimensional chromatic space (i.e. the normalized (R,G,B) space (R/T, G/T, B/T), where T=R+G+B), for example, can be used to pre-localize faces in images. FIG. 4(b) shows a result taken from a test image 26 of FIG. 4(a). The erosion and dilatation operators from the mathematical morphology are used to get rid of small isolated segments 28, as illustrated in FIG. 4(c). In this example, a 4×6 operator was used, however a different operator can be used. Then a PCA technique is used to localize the eyes and the mouth. Using the differences between the x and y coordinates of the two eyes, the original image is rotated until obtaining a frontal face, i.e. both eyes have the same y value (mathematically, a $\tan(\|y_1-y_2\|/\|x_1-x_2\|)$, where $(x_1, y_1)$ and $(x_2, y_2)$ are the coordinates). Finally a contour technique is used to search for the boundaries of the face 30 (i.e. top, down, left and right). FIG. 4(d) depicts a face localization result.

Figure 4E:
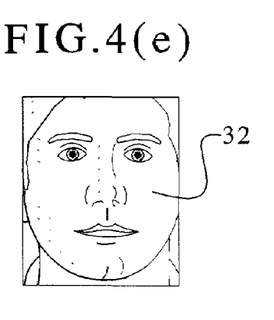
FIG. 4(e) illustrates a standard face of the test face.

Referring to FIG. 4(e), the face 30 is then morphed to a final "standard" face 32 of 120 by 170 pixels. After morphing, the eye centers, the medial line of the nose, etc., are expected to be at the same pixel coordinates in all images. Obviously, this will only be true where the localization step has no error, which is almost never the case. Accordingly, there is a need for Applicant's present method to deal with the localization problem. The morphing procedure is necessary, so as to guarantee that only the appearance of the face is taken into account by the recognition system.

Notice that not all feature can be detected in images (54–64) of FIG. 3. To overcome this, the eye positions in images (54–58) and the mouth position in images (60–64) were obtained by averaging the values among all other face images (i.e. (40–52)) of all subjects.

1.2 The Localization Error

It would be unrealistic to hope for a system that does localize the above mentioned features (e.g. eyes, mouth, top, etc.) with a high degree of precision. Due to different facial expressions, lighting conditions, etc., the localization stage is expected to be error prone. The trouble with this is that the eigen-representation of the correct localized face differs from the eigen-representation of the actual computed localization, which can ultimately imply an incorrect recognition. An example was depicted in FIG. 1(a).

Fortunately, this problem can be modeled by means of a probability density function. Assume, for the time being, that the localization error (for both, the x and y axes) is known. Then, by simply creating all possible localizations (accounting for this error) in the learning stage, the subspace where this data lies can be easily modeled, as in FIG. 1(b). However, one still needs to know the error that the localization algorithm is performing. To accomplish this, each of the above enumerated facial features in a number of images, such as 500 images, are manually localized as precisely as possible. Then, the error of the above described localization algorithm is computed in contrast to the manually localized features. In the present example, the localization was found to have a variance error of ±3 pixels about the x image axis, which error is denoted as $vr_x$, and of ±4 pixels about the y image axis, which error is denoted as $vr_y$.

Once the localization error is known, the method works as follows. For every sample image, the above-described localization approach is computed. Each sample image is then morphed to r possible solutions, which account for all possible errors from 0 to ±3 about the x axis and from 0 to ±4 about the y axis; where r is of the order of $2^{2f}$, f being the number of features localized in each face $$\left(\text{precisely, } r = \left(vr_x * \sum_{i=1}^{f} \binom{f}{i}\right) * \left(vr_y * \sum_{i=1}^{f} \binom{f}{i}\right) = vr_x * (2^f - 1) * vr_y * (2^f - 1)\right).$$

When the number of features detected in an image is large, this complexity is to be considered. In those cases, knowing that accounting for the error in only one feature at a time would not imply a significant change of appearance (in practice, almost none), a subset of all these r is expected to suffice.

2.0 Local Probabilistic Approach

One known method to deal with partially occluded objects (such as faces) is by using local approaches. In such a known method, a face is divided into several parts that are analyzed in isolation, and then a voting space is used to search for the best match. However, a voting technique can easily misclassify a test image, because it does not take into account how good a local match is (in relation to the other local matches). The present invention overcomes this known disadvantage by providing a probabilistic approach.

2.1 Learning Stage

According to the method of the present invention, the learning procedure can be divided into two steps: the local eigenspace representation, and the generation of the Gaussian models.

To generate the local eigenspaces, the localization stage is first applied to each of the training images, and then the learning set $X_k = \{x_{1,1,k}, \ldots, x_{n,m,k}\}$ is generated; where $x_{i,j,k}$ is the $k^{th}$ local area of the $j^{th}$ (morphed) sample image of class i (in its vector form), n is the total number of classes (i.e. people), and m the number of samples per class.

For the present example, it is assumed that the number of samples is equal for all classes. Alternatively, derivations might slightly differ from those described below. It is also assumed that k=1, 2, 3, 4, 5, 6, i.e. six local areas. To obtain each $x_{i,j,k}$ sample, an ellipse-shape segment $x^2/d_x^2 + y^2/d_y^2 = 1$ is used (See FIG. 2(c)).

After finding the mean vector $\mu_k$ of each $X_k$, the covariance matrices $Q_k = (X_k - \mu_k)(X_k - \mu_k)^T$, $\forall k$ are computed. Eigenspaces are obtained by taking the p eigenvectors associated with the largest eigenvalues of Qk. (Note, that the localization error is not taken into account yet.)

The above eigenspace representation is not adequate for recognition where the illumination intensity, illumination sources and/or any other environmental feature changes. As is known, the first three eigenvectors of the eigenspace (normally) correspond to the illumination change. Unfortunately, there are two main problems that make this method impractical. First, we do not know whether the database we are given contains different illumination sources/conditions. Second, although these eigenvectors basically contain illumination information, they might also contain discriminant information that is essential to discriminate between some of the classes.

A better approach is to use a separate eigenspace for each group of images that were taken under the same conditions, i.e. same illumination conditions, same facial expression, etc. To clarify this, refer to FIG. 3: images (40) to (64) of a single person correspond to 13 different conditions, whereas image (40) for all subjects correspond to a single condition. Note that this approach needs all learning images to be labeled (i.e. to which class they belong to) which might be seen as a drawback.

More formally, let $X_{j,k} = \{x_{1,j,k}, \ldots, x_{n,j,k}\}$ be the set of images corresponding to $k^{th}$ local part and $j^{th}$ learning condition. All j*k eigenspaces are constructed by finding the p eigenvectors associated to the highest eigenvalues of each covariance matrix $Q_{j,k} = (X_{j,k} - \mu_{j,k})(X_{j,k} - \mu_{j,k})^T$; where $\mu_{j,k}$ is the mean feature vector of $X_{j,k}$. In the following, these eigenspaces are referred to as $Eig_{j,k}$, and to their projecting matrices are referred to as $E_{j,k}$ (which are built by means of the p eigenvectors associated to the largest eigenvalues of their associated $Q_{j,k}$).

Once all those eigenspaces have been computed, one is ready to search for the subspaces that account for the localization error. To achieve that, all learning instances (accounting for the localization error) are projected onto the above computed eigen-representation. Mathematically, Applicant defines $\hat{X}_{j,k} = \{\hat{x}_{1,j,k}, \ldots, \hat{x}_{n,j,k}\}$, where $\hat{x}_{i,j,k} = \{x_{i,j,k}^1, \ldots, x_{i,j,k}^r\}$ and represents all possible images accounting for all possible error of localization (recall that the sample localization error has a variance of ±3 by ±4 pixels). For obvious reasons, each $\hat{X}_{j,k}$ is only projected onto its corresponding eigenspace by means of $E_{j,k}$. Each $\hat{x}_{i,j,k}$ set is expected to be within a small subspace of its corresponding $\text{Eig}_{j,k}$, which can be modeled by means of a Gaussian distribution $G_{i,j,k}$ with an associated mean $\mu_{i,j,k}$ and covariance matrix $$\sum_{i,j,k};$$

where $G_{i,j,k}$ is the Gaussian model associated with the training sample $\hat{x}_{i,j,k}$ and $$\sum_{i,j,k}(\hat{x}_{i,j,k} - \mu_{i,j,k})(\hat{x}_{i,j,k} - \mu_{i,j,k})^T.$$

Notice that the set $\hat{x}_{i,j,k}$ (which can be very large) needs not be stored in memory, only the Gaussian model (mean and covariance matrix) is needed for consecutive computations.

2.2 Identification Stage

When a test image $t_z$ is to be recognized, the following computations are applied. First, the face is localized by means of the above-described method (See Section 1), and the face is morphed to its final 120 by 170 pixel array (which is herein denoted as $\bar{t}_z$). Since the localization error was already considered in the learning stage, it is not necessary to address that problem at this point.

Each of the six local areas are projected onto the above computed eigenspaces. In more detail, $\hat{t}_{z,j,k} = E_{j,k} \bar{t}_{z,k}$, $\forall j,k$; where $\bar{t}_{z,k}$ represents the $k^{th}$ local part of $\bar{t}_z$, and $\hat{t}_{z,j,k}$ its projection onto $\text{Eig}_{j,k}$. Since one may not know to which of the environmental conditions this test image belongs to, one needs to project $\bar{t}_{z,k}$ onto all possibilities ($\text{Eig}_{j,k}$ $\forall j$) and then either search for the best match or add all probabilities (distances). As stated in the introduction, it is better to add probabilities rather than making hard classification decisions, because it allows one to select the correct class even if this is not the best (first) one. Since the mean feature vector and the covariance matrix of each local subspace are already known, the probability of a given match can be directly associated with a suitably defined distance $$(\hat{t}_{z,j,k} - \mu_{i,j,k})\sum_{i,j,k}(\hat{t}_{z,j,k} - \mu_{i,j,k}),$$

i.e. the Mahalanobis distance. Mathematically, $$LocRes_{i,k} = \sum_{j=1}^{m} Mh(\hat{t}_{z,j,k}, G_{i,j,k});$$

where $Mh(\cdot)$ is the Mahalanobis distance, and $LocRes_{i,k}$ the recognition result of the $k^{th}$ local area of class i. Generally, the distance from the test sample vector to each $\text{Eig}_{j,k}$ is also taken into account; i.e. added to $LocReS_{i,k}$.

Finally, all local distances (probabilities) are added, $$Res_i = \sum_{k=1}^{6} LocRes_{i,k},$$

and search is made for the minima (maxima), $RecClass = \text{argmin}_i Res_i$; where $RecClass \in [1, n]$. If a video sequence is supplied, one continues to add distances (probabilities) for each of the images and only computes the minima (maxima) at the end of the sequence or when a threshold has been reached.

3.0 Experimental Results

The Inventor's experimental results which are presented herein were obtained using the AR-face database. {The AR database of face images is publicly available at http://rvl1.ecn.purdue.edu/~aleix/aleix_face_DB.html} This database consists of over 3200 color images of the frontal images of faces of 126 subjects. There are 26 different images for each subject. For each person, these images were obtained in two different sessions separated by two weeks, 13 images being recorded in each session. For illustration, these images for one subject are shown in FIG. 3. All images were taken using the same camera under tightly controlled conditions of illumination. Each image in the database consists of a 768×576 array of pixels, and each pixel is represented by 24 bits of RGB color values. For the experiments reported herein, 100 different individuals (50 males and 50 females) were randomly selected from this database (that is a total of 2600 images). As stated above, images were morphed to a final 120×170 pixel size array. After morphing, all images were converted to gray-level images by adding all three color channels.

For each of the experimental results a set of images was assigned to learning(denoted as gallery) and another to testing (denoted as probes). The following table summarizes the Inventor's experiments:

| Test number | Gallery | Probes |
|---|---|---|
| 1 | (40)/100 | (42–46, 54, 60)/500 |
| 2 | (40)/100 | (60–72, 80, 86)/600 |
| 3 | (40, 42)/200 | (44, 46, 54, 60)/400 |
| 4 | (40, 42)/200 | (68–72, 80, 86)/500 |
| 5 | (40, 52)/200 | (42–50, 54–64)/1100 |
| 6 | (40, 52)/200 | (66–90)/1300 |

Figure 5A:
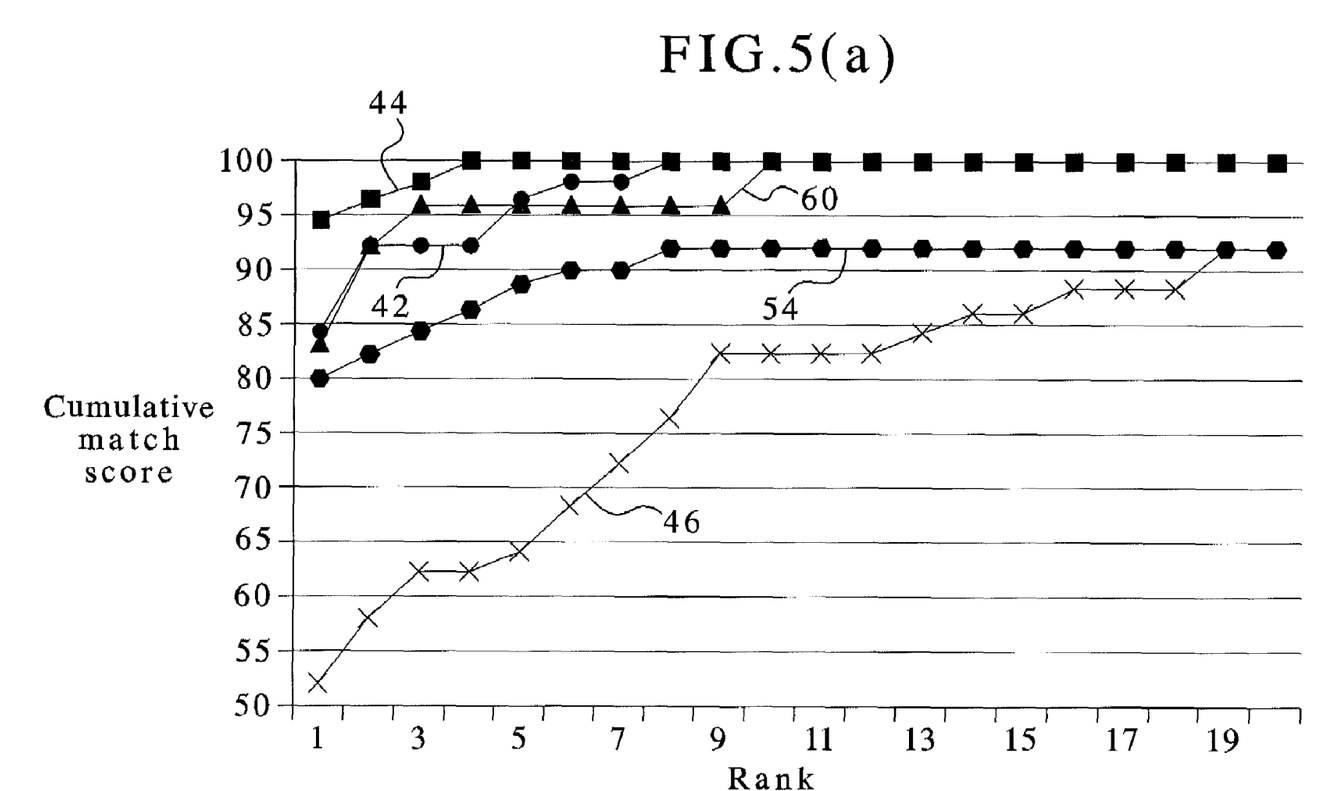
FIG. 5(a) illustrates experimental results obtained in accordance with the present invention.
Figure 5B:
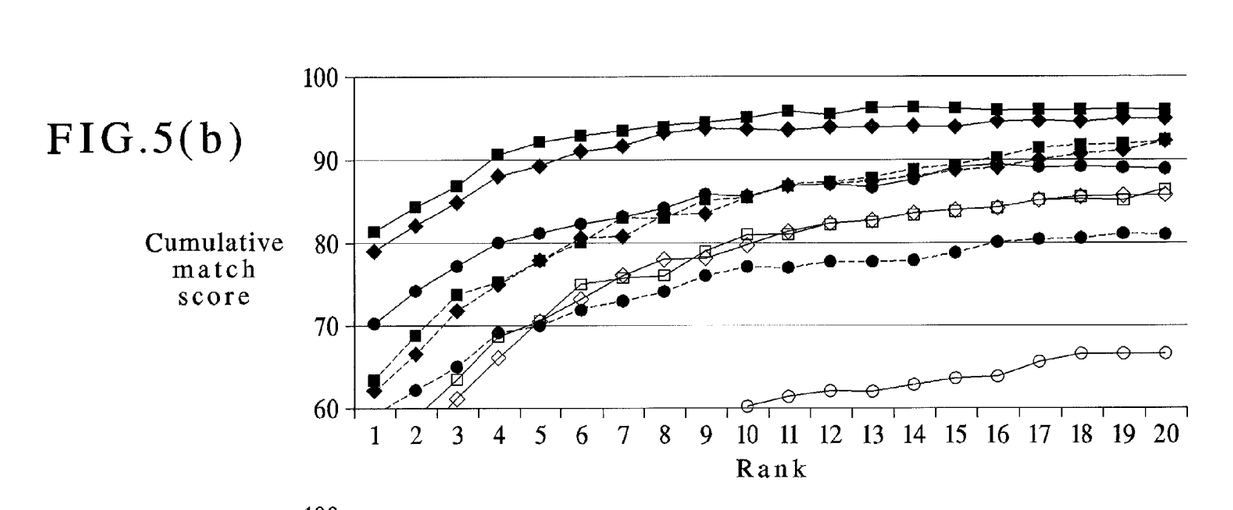
FIG. 5(b) illustrates a comparison of experimental results obtained in accordance the present invention, a voting PCA approach, and a global PCA approach.
Figure 5C:
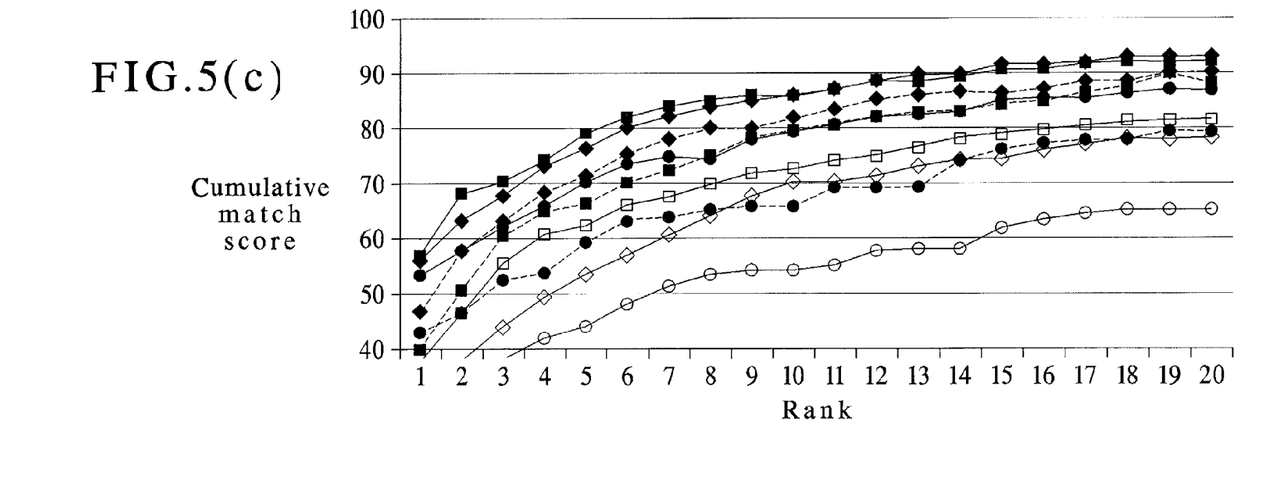
FIG. 5(c) illustrates a comparison of experimental results obtained in accordance the present invention, a voting PCA approach, and a global PCA approach.

Values within the Gallery and Probes boxes state for: (image names as in FIG. 3)/quantity of images employed. For all these tests, 20-dimensional eigenspaces were used. The local ellipsoidal areas were of $d_x=30$, $d_y=24$. Results of test 1 are displayed in FIG. 5($a$). These results are shown for each separate testing image (42–46, 54, 60) to facilitate discussion. FIGS. 5($b$) and 5($c$) summarizes results of tests 1 to 6. In these cases, results are shown as: Local PCA: results of Inventor's present method (shown as hard lines); Voting PCA: results obtained using a voting method to select the best local match, i.e. $LocRes_{c,k}=1$, where $c=\text{argmin}_i Mh(\hat{t}_{z,j,k}, G_{i,j,k})$—note that the Inventor's probabilistic method is used in all other steps—(this is shown as dotted lines); Global PCA: results of an alternative PCA approach (displayed with open symbols). Results are shown as a function of Rank (which means that the correct solution is within the R nearest outcomes) on the horizontal axis and Cumulative match score (which refers to the percentage of successfully recognized images) on the vertical axis. In FIG. 5($b$), test 1 is designated by a diamond, test 3 is designated by a square, and test 5 is designated by a circle. In FIG. 5($c$), test 2 is designated by a diamond, test 4 is designated by a square, and test 6 is designated by a circle.

Thus, referring to FIG. 5($a$), it is apparent that the Inventor's present method easily handles occlusions due to scarves—i.e. where the mouth's part of the image is not used to identify the test image—(85–95%), and partially solves the sun-glasses occlusion problem (~80%).

The results displayed in FIG. 5(a) also illustrate that the Inventor's present method is quite robust to the recognition of small changes due to facial expressions (around 84% for smiles and 94% for anger). This is mainly due to the fact that although some of the local parts tend to change widely, others remain similar. It is also likely that although small local changes make the eigen-representation of a test face to be close to an incorrect class, the correct match is still quite probable (thus, adding valuable information to the global recognition). As illustrated in FIG. 5(a), there is a rapidly increasing match score of the scream face (e.g. item 46 of FIG. 3), moving from ~50% for Rank=1 to ~90% for Rank=19. Even though incorrect classes are chosen for such extreme facial expressions, good information is still available.

Thus, as illustrated for the data sets illustrated in FIGS. 5(a) and 5(b), the Inventor's inventive probabilistic approach outperforms a voting method and, further, also accounts for the localization and occlusion problems. The comparison with global PCA is unfair (since this approach does not attempt to solve any of the problems herein analyzed), and is only shown as a reference. As illustrated in FIG. 5(c), the recognition of duplicate images is also improved, because some local areas change less than others.

The foregoing provides an inventive face recognition method that is robust to imprecise localization of the mug face and allows faces to appear under certain occlusions. Further, as discussed above, the Inventor's present method is also capable of learning local features (such as illuminations) that can be very useful for recognition. The Inventor's present method of a probabilistic approach has shown to be superior to a local PCA method where a hard classification is used to select for the best match in each local area. However, the present invention can also incorporate other PCA techniques.

As is apparent from the foregoing specification, the present invention is susceptible to being embodied with various alterations and modifications which may differ particularly from those that have been described in the preceding specification and description. It should be understood that it is desired to embody within the scope of the patent warranted herein all such modifications as reasonably necessary and properly come within the scope of the presently defined contribution to the art.

What is claimed:

1. A method of recognizing an imprecisely localized test face, comprising:
   a) during a learning stage, using a feature space representation of a learning image for each of plurality of subjects, computing a subspace that represents localization errors within the feature space by
      1) calculating an actual localization error of the localization of the learning images;
      2) accounting for the calculated actual localization error, projecting all possible morphed faces onto the feature space; and
      3) for all possible faces, modeling the subspace where all of the possible localizations of the possible faces lie using a Gaussian distribution; and
   b) during an identification stage, recognizing a test face based on the computed subspace from the learning stage.

2. A method of recognizing a partially occluded test face, comprising:
   for all possible faces, dividing the possible face into n different local parts;
   modeling each of the n local parts using a Gaussian distribution corresponding to a predetermined subset that represents localization error;
   computing a global probability of the test face by adding all local probabilities defined by the Gaussian distribution; and
   recognizing the test face based on the computed global probability.

3. The method of claim 1, further comprising the steps of:
   prior to computing the subspace, computing the localization of the learning image by:
      pre-localizing the learning image;
      omitting unwanted segments;
      localizing both eyes and the mouth of the learning image;
      rotating the face until the learning image is frontal;
      identifying boundaries of the learning image; and
      morphing the learning image to a standard face.

4. The method of claim 1, wherein the step of calculating the actual localization error comprises:
   manually localizing a number of pertinent features of all possible faces; and
   computing the actual localization error as a difference between the localization of the learning image and the manually localized features.

5. The method of claim 2, wherein the modeling step further comprises the steps of:
   generating a local eigenspace representation by:
      applying a localization stage to each of the possible faces;
      generating a learning set;
      finding a mean vector of each element of the learning set;
      computing covariance matrices for each element of the learning set;
      obtaining the local eigenspaces by taking the eigenvectors associated with the largest eigenvalues of the covariance matrices; and
   generating a Gaussian model by:
      constructing all eigenspaces by finding eigenvectors associated to the highest eigenvalues of each covariance matrix; and
      searching for subspaces that account for the localization error by projecting all learning instances onto the constructed eigenspaces.

6. The method of claim 2, wherein the step of computing the global probability of the test face further comprises the steps of:
   localizing the test face;
   morphing the test face to a final standard face;
   projecting each of the n local parts onto computed eigenspaces, wherein a probability of a given match is directly associated to a Mahalanobis distance; adding all local Mahalanobis distances; and
   searching for minima from the added distances.

7. A method of recognizing a test face, the method comprising:
   a) using a feature space representation of a learning image for each of a plurality of subjects, computing a subspace that represents localization errors within the feature space by
      1) calculating an actual localization error of the localization of the learning image;

2) accounting for the calculated actual localization error, projecting all possible morphed faces onto the feature space; and
3) for all possible faces, modeling the subspace where all of the possible localizations of the possible faces lie using a Gaussian distribution;

b) accounting for possible partial occlusions of the test face by:
1) for all possible faces, dividing the possible face into n different local parts;
2) modeling each of the n local parts using a Gaussian distribution corresponding to a predetermined subset that represents localization error;
3) computing a global probability of the test face by adding all local probabilities defined by the Gaussian distribution; and recognizing the test face based on the computed subspace and/or the accounted for possible partial occlusions.

* * * * *